United States Patent [19]

Girgis

[11] Patent Number: 5,466,528
[45] Date of Patent: Nov. 14, 1995

[54] CHEMICALLY TREATED GLASS TYPE SUBSTRATES WITH VINYL POLYMER COMPATIBILITY

[75] Inventor: Mikhail M. Girgis, Wexford, Pa.

[73] Assignee: PPG Industries, Inc., Pittsburgh, Pa.

[21] Appl. No.: 324,432

[22] Filed: Oct. 17, 1994

Related U.S. Application Data

[63] Continuation of Ser. No. 934,093, Aug. 21, 1992, abandoned.

[51] Int. Cl.$^6$ ...................................................... B32B 9/00
[52] U.S. Cl. ...................... 428/391; 428/375; 428/378; 57/250; 57/295; 57/309; 57/314; 427/385.5; 427/416; 427/417
[58] Field of Search .................................... 428/375, 395, 428/396, 391, 378, 292; 260/398, 413, 421; 427/385.5, 416, 417; 57/250, 295, 249, 309, 314

[56] References Cited

U.S. PATENT DOCUMENTS

| | | | |
|---|---|---|---|
| 2,200,815 | 5/1940 | Ackley | 260/309 |
| 2,267,965 | 12/1941 | Wilson | 260/309 |
| 2,268,273 | 12/1941 | Wilkes et al. | 8/142.5 |
| 2,355,837 | 8/1944 | Wilson | 260/309.6 |
| 2,881,194 | 4/1959 | Peerman et al. | 260/404.5 |
| 3,227,192 | 1/1966 | Griffiths . | |
| 3,265,516 | 8/1966 | Triplett et al. | 106/213 |
| 3,293,094 | 12/1966 | Nairn et al. | 156/79 |
| 3,458,337 | 7/1969 | Rugg | 117/15 |
| 3,597,265 | 8/1971 | Mecklenborg | 117/126 GR |
| 3,803,072 | 4/1974 | Graham | 260/29.6 |
| 3,973,071 | 8/1976 | Fahey | 428/292 |
| 4,002,445 | 1/1977 | Graham | 65/3 C |
| 4,221,602 | 9/1980 | Walser | 106/211 |
| 4,272,621 | 6/1981 | McFadden et al. | 525/355 |
| 4,390,647 | 6/1983 | Girgis | 523/212 |
| 4,470,252 | 9/1984 | Brodmann | 57/309 |
| 4,610,707 | 9/1986 | Grundy | 65/202 |
| 4,762,750 | 8/1988 | Girgis et al. | 428/378 |
| 4,795,678 | 1/1989 | Girgis | 428/391 |
| 5,038,555 | 8/1991 | Wu et al. | 52/127 |

*Primary Examiner*—Patrick J. Ryan
*Assistant Examiner*—Merrick Dixon
*Attorney, Agent, or Firm*—Ann M. Odorski; Kenneth J. Stachel

[57] ABSTRACT

A chemical treating composition, treated glass-type surfaces and vinyl addition polymer compatible substrates with such treated surfaces are provided where the treating composition has at least five nonaqueous components. These components include in weight percent of the nonaqueous component the following: at least one starch in an amount from around 1 to around slightly greater than 50, at least one wax in an amount to have a ratio with the starch and a range of around 0.9 to 1 wax to starch to an excess amount of wax or amounts greater than 1 to 1; at least one cationic lubricant from around 3 to around 20; at least one organo metallic coupling agent from around 1 to around 5; at least one material such as a second film forming polymer in an amount from around 1 to around 15 but always in an amount less than the amount of wax and/or condensation products of polyamines and fatty acids in an amount in the range of from around 1 to around 20 weight percent of the nonaqueous components and/or polymer adhesion promoter such as esters of carboxylic acids and/or anhydrides like: aliphatic and/or cyclic dicarboxylic acid esters, adipates, sebacates, azelates, phthalic esters, trimellitic esters that are present in an amount up to around 20 weight percent of the nonaqueous components. In this formulation, the amount of wax is always greater than the amount of each individual nonaqueous component other than starch whereas with starch, it can be in a ratio of slightly less than 1 to 1. The chemical treatment is placed on glass-type surfaces such as glass where the substrate can be of any form or shape such as fibers that have very good adhesion to matrix polymers such as vinyl addition polymers and plastisols and organosols thereof to provide polymer reinforcement or substrates for encapsulation, impregnation or coating.

20 Claims, No Drawings

CHEMICALLY TREATED GLASS TYPE SUBSTRATES WITH VINYL POLYMER COMPATIBILITY

This is a continuation of application Ser. No. 07/934,093, filed Aug. 21, 1992, now abandoned.

The present invention is directed to glass-type surfaces like hydroxyl-containing and/or metal oxide surfaces having a chemical treatment and the treatment itself where such substrates as fibers are for reinforcement of or encapsulation by or coating by or impregnation by vinyl addition polymer matrices.

Various chemical treatments exist for glass-type surfaces such as glass fibers to aid in their processibility and applications. This composition can be a size in the case of treating glass fibers during their formation to form bundles of fibers, which can also be referred to as strands. In producing twisted glass fiber strands for yarn, a useful size is a starch-oil size. This size provides protection through the rigors of the formation of the bundles of fibers or strands and twisting of one or more bundles to form yarn. This size should be removable by some operation like a heat cleaning step from the cloth. Other processing steps where the size can provide protection involve those where the fibers pass by contact points as in the winding, of the fibers and stands onto a forming package, drying the aqueous-based or solvent-based size to remove the water or solvent, twisting from one package to a bobbin, beaming to place the twisted yarn onto very large packages ordinarily used as the warp in a fabric, chopping in a wet or dry condition, or roving into larger bundles or groups of strands.

In addition, sizings can play a dual role when placed on fibers that reinforce polymeric matrices in the production of fiber reinforced plastics. In this application the size provides protection and also can provide compatibility between the fiber and the matrix polymer or resin. For instance, glass fibers in the forms of both woven and nonwoven fabrics and mats and rovings and chopped strands have been used with vinyl addition polymers like polyvinyl chloride (PVC) such as powders, plastisols and/or organosols for impregnation by or encapsulation by or reinforcement of the PVC. In such applications the yearning strived for is to maximize the compatibility between the surface and the polyvinyl chloride while also improving the ease of processability and manufacturability.

It is an object of the present invention to provide chemically treated glass-type substrates, as well as the treating composition for the substrates, with good compatibility with vinyl addition polymers for encapsulation, impregnation, reinforcement, or coating, where the compatibility is good enough to be an improvement over that obtained with starch-oil type formulations and where the processability of the treated substrate before and after use with the vinyl addition polymer results in a reduction in defects.

SUMMARY OF THE INVENTION

The foregoing and other objects gleaned from the following disclosure are accomplished by the glass-type substrates such as fibers with a chemical treating composition as vinyl addition polymer substrates and reinforcements. The chemical treating composition is an aqueous treating composition having a predominant amount of water and an amount of nonaqueous components in the range of around 1 to around 30 weight percent of the aqueous chemical treatment. The nonaqueous components, which are essentially free of any mono-, di-, and triglyceride oils, are comprised of, on a weight percent basis of the nonaqueous components, as follows:

one or more starches in an amount of from around 1 to slightly greater than 50, wax and oxidized derivatives thereof present in an amount to have a ratio of wax to starch of from around 0.9:1 to an amount greater than the amount of starch and a major amount of the nonaqueous components where the amount of wax is always in a major amount of the nonaqueous components for the non-starch components of the composition, one or more cationic lubricants in an amount from around 1 to 20 weight, one or more organo silane coupling agents in an amount from around 1 to 5, and at least one material selected from: a second polymeric film forming material in addition to the starch, an amount from around 1 to around 15; condensation products of polyamines and fatty acids in an amount in the range of from around 1 to around 20 weight percent of the non-aqueous components; and polymer adhesion promoters selected from: esters of carboxylic acids and/or anhydrides like: aliphatic and/or cyclic dicarboxylic acid esters, adipates, sebacates, azelates, phthalic esters, trimellitic esters that are present in an amount up to around 20 weight percent of the non-aqueous components but always in an amount less than the amount of wax.

DETAILED DESCRIPTION OF THE INVENTION

In the following description of the present invention, reference to "weight percent" for components of the chemical treatment refers to weight percent of the non-aqueous components. This includes the solids content of emulsions and dispersions, even those that are aqueous-based, and non-aqueous liquid materials and solid materials. When the terms "weight percent" are used in a different context this will be noted.

The wax is present in the treating composition in an amount of around 47 weight percent of the nonaqueous components where the ratio of the wax to starch can be from around 0.9 to 1 to greater than 1:1. The amount of the wax is the major non-aqueous component compared to all of the non-starch non-aqueous components in the formulation. The preferred amount of the wax is from 50 weight percent for a greater than 1:1 ratio with the amount of starch and a major amount of all of the non-aqueous components of the composition. With this unusually large amount of wax relative to the amount of the starch in the formulation, and when the treating composition is applied to the glass-type surfaces such as glass fibers that are to be twisted, it is necessary to dry the treating composition to a moisture content of less than around 1 weight percent of the treated glass fiber strands. This enables the formation of a coating on the surface that may have some uncoated sections but that is somewhat resistant to rubbing off when the surface meets contact points in processing. The preferred wax is any microcrystalline wax or an oxidized derivative of the microcrystalline wax that are known to those skilled in the art. Preferably the microcrystalline nonionic or anionic and essentially free of cationic waxes. These types of waxes are preferred because of their smaller particle sizes and their formation of a more uniform coating.

Blends or mixtures of these microcrystalline waxes with other hydrocarbon waxes can be used in any ratio of one to the other from 1 to 99 to 99 to 1 microcrystalline-type wax to other hydrocarbon waxes. Suitable nonexclusive examples of other types of waxes for these blends are disclosed in U.S. Pat. Nos. 4,470,252 and 4,795,678. It is also possible in certain instances where these other types of hydrocarbon waxes are used in lieu of the microcrystalline wax.

These microcrystalline waxes can be from any sources known to those skilled in the art such as motor oil wax, residual microcrystalline wax from a petroleum removed from a residual lubricating oil and tank-bottom waxes. The partially oxidized microcrystalline waxes with their increased saponifiable content, can be produced by any process known to those skilled in the art. The wax can be used in an emulsion or dispersion or any other form known to those skilled in the art. The most preferred microcrystalline wax is a nonIonic emulsion or dispersion of an oxidized microcrystalline wax where the percent solids of the wax in the emulsion can be around 25 to around 50 weight percent. Such a material is available from Michelman Inc., 9089 Shell Road, Cincinnati, Ohio 45236-1299 under the trade designation MICHEMLUBE 296. The most preferred amount of this wax emulsion in the treating composition is around 50 weight percent in a ratio with the starch of 1 to 1 for the wax to the starch up to around 4 to 1.

Typically, the types of starches that can be used include those having a low amylose content, which means that the starch composition can contain up to about 40 weight percent amylose in the starch, preferably between around 10 to around 30 weight percent. The preferred starches utilize a mixture of modified potato and crosslinked corn starches both with a low amylose content. Starches conforming to these criteria are available as Amaizo 213 starch manufactured by the American Maize Products Company and as National 1554 manufactured by National Starch Company. Another example of a suitable starch is a low amylose starch that is water soluble after cooking such as a potato starch ether that is nonionic like that available from Avebe b.a. 9607 PT Foxhol, The Netherlands under the trade designation "Kollotex 1250". The amount of starch that is present ranges from at least 1 to slightly greater than 50 weight percent of the non-aqueous components, and preferably from around 10 to 50 weight percent. Additional types of starches that can be used are given in the book "The Manufacturing Technology of Continuous Glass Fibers" by K. L. Lowenstein, Elsevier Publishing Company, New York, 1973, at pages 192–193. The author describes, in general, the typical starches utilized in the fiber glass industry today in preparing textile glass fiber strands. Other suitable starches include those described in U.S. Pat. Nos. 3,227,192; 3,265,516 and 4,002,445.

In addition to the wax and starch, at least three other types of components are present in the treating composition. Two of these materials are one or more organo metallic coupling agents like organo functional silane coupling agents, and one or more cationic lubricants. The silane coupling agent is present in an amount of around 1 to around 5 weight percent, and the cationic lubricant is in the range of from around 1 to around 20 weight percent of the non-aqueous components. Preferably the amounts of these components are in weight percent: silane, 2 to 4 and cationic lubricant, around 5 to 15. Nonexclusive examples of the organo silane coupling agents and the cationic lubricants are those shown in U.S. Pat. No. 4,795,678. Additional examples of the silane coupling agent are those shown in U.S. Pat. Nos. 4,390,647 and 5,038,555. The preferred organo metallic coupling agent is that available from Union Carbide Chemicals and Plastics Company under the trade designation A-174 which is a gamma-methacryloxy propyltrimethoxy silane. One suitable example of the cationic lubricant is Emerylube 6717 partially amidated polyamine available from Henkle Corporation, Polymers Division, LaGrange, Ill. 60525, see U.S. Pat. No. 3,597,265. Another is Cation-X lubricants which are alkyl imidazoline derivatives as in U.S. Pat. Nos. 2,200,815; 2,267,965; 2,268,273; and 2,355,837, for instance, the reaction product of the stearic acid, tetraethylene pentamine and acetic acid. Also blends of these two cationic lubricants in any ratio can be used.

The additional material is either one or all of the following: one or more polymeric materials, condensation products of polyamines and fatty acids and polymeric adhesion promoting agents. This material is present in an amount of up to around 50 weight percent of the composition, but the wax is always present in a predominant amount compared to the non-starch components. Preferably, one additional material from each of the aforementioned classes are present in the composition.

The polymeric material can be any film forming polymer that is dispersible or emulsifiable in aqueous solutions or dispersions with or without the aid of external emulsifiers. Nonexclusive examples include those like polyvinylpyrrolidone, polyoxyalkylene polyols, polyalkylene polyols and mixtures thereof and mixtures with polyalkylene glycols. The preferred polymeric material is the polyvinylpyrrolidone with a molecular weight of around 30,000. The one or more polymeric materials are present in amount of about 1 to about 15 weight percent and preferably from around 3 to For the one or more condensation products of polyamines with fatty acids that are preferably present suitable nonexclusive examples of this material are those having the formula:

wherein: R is an aliphatic radical having from 14 to 34 carbon atoms, preferably unsaturated cycloaliphatic divalent radicals containing from 26 to 34 carbons atoms; n is an integer ranging from 0 to 3, preferably 2; and m ranges from 1 to 15, preferably from 1 to 2.

The polyamides in the above formula can be obtained, for example, by the condensation of a polyamine with a difunctional fatty acid. The polyamine used can be, for example, an alkyl amine having from 2 to 8 carbon atoms, such as ethylenediamine, diethylenetriamine, tetraethylenepentamine or triethylenetetramine. The difunctional fatty acid can be obtained, for example, from the dimerization of fatty acids having from 8 to 18 carbon atoms, such as lauric acid, myristic acid, myristoleic acid, palmitoleic acid, palmitic acid, stearic acid, oleic acid, linoleic acid or linolenic acid. Such polyamides are commercially available under the trade names "Versamid" and Genamid" from Henkel Corporation, LaGrange, Ill. 60525. One in particular, Versamid 140, has a viscosity of 25° C. of 116 poise, weighs 8.1 pounds per gallon, has a solids content of 100 percent, a specific gravity of 0.970, no volatiles at 70° F. and a flash point >365° F. A process for the preparation of such polyamides are described, for example, in U.S. Pat. No. 2,881,194 to Peerman et al. The amount of the condensation product can be in the range of up to around 20 weight percent of the non-aqueous components of the composition and most preferably is in the range of from around 5 to around 12.

The other component that preferably is present is the polymer adhesion promoter that promotes adhesion with the polymeric material like poly(vinylchloride) formulations. Such polymeric materials may be the matrix polymer for reinforcement or may be an encapsulant or impregnant for substrates having a surface coating of the present inventive composition, or may be a coating for such substrates. Nonexclusive examples of these adhesion promoters include esters of carboxylic acids and/or anhydrtdes like: aliphatic and/or cyclic dicarboxylic acid esters, adipates, sebacates, azelates, phthalic esters, trimellitic esters. These materials can be formed by any process known to those skilled in the art as the reaction of acid or anhydride with alcohols. The acids can be the cyclic such as ortho-, iso-, or terephthalic, benzoic, trimellitic or the linear acids such as adipic, azelaic, sebacic and the like. The alcohols can be monohydric such as isodecanol, butanol, isononyl, mixed alkyl or polyhydric. A few nonexclusive examples of the promoters include di-2-ethylhexylphalate, dioctylphthalate, diisooctylphthalate, diisodecylphthalate, 1,2,4-benzene tricarboxylic acid esters with aliphatic alcohols having a number of carbon atoms ranging from around 6 to around 10 and other mixed normal alkyl trimellitates.

Preferably, the adhesion promoters have a boiling point above around 225° C. (437° F.) at a pressure of 10 millimeters of mercury (mmHg).

One such promoter that is commercially available is Santicizer® 160 produced by Monsanto Corporation which is a clear oily liquid having a boiling point of 240° C. (464° F.) at 10 mmHg, a specific gravity of 1.12. Another suitable promoter is diisononyl phthalate (DINP) (sold as PX-109 by Aristech Chemical Corporation) which has a boiling point of 252° C. (486° F.) at 5 nnHg, a molecular weight of 418, a pour point of −45° C., a specific gravity of 0.971 at 25° C./25° C., a flash point of 435° F. (224° C.), a viscosity of 72 cps at 25° C. (77° F.) and a refractive index of 1.485 at 25° C. A particularly suitable promoter for use in this invention is mixed normal alkyl trimellitate sold as PX-336 by Aristech Chemical Corp. This PX-336 is a 1,2,4-benzene tricarboxylic acid, hexyl octyl decyl ester material having a boiling point of 275° C. at 1 mmHg, a molecular weight of 585, a freeze point of −17° C., a specific gravity of 0.975 at 25° C./25° C., a flash point of 532° F. (278° C.), a viscosity of 103 cps at 25°C., a refractive index of 1.482 at 25° C. and an ester content of 99.0% minimum.

An emulsifier may be, and preferably is, used with this invention to aid in the emulsification of the promoter. Any suitable emulsifier with the appropriate hydrophilic/lipophilic balance with the promoter can be used. Preferred are sorbitan based emulsifiers, examples being polyoxyethylene (4) sorbitan monolaurate and polyoxyethylene (5) sorbitan monolaurate which are produced by ICI America Inc. under the trade names Tween® 21 emulsifier and Tween® 81 emulsifier, respectively. Tween® 21 has a flash point of 410° F. (210° C.) C.O.C. (Cleveland Open Cup), a specific gravity of 1.1 and is a yellow oily liquid. Tween 81 has a flash point of greater than 300° F. (149° C.) C.O.C., and is also a yellow oily liquid. If used, the emulsifier is generally present in an amount of up to about 20 percent, preferably about 10 weight percent, of the promoter.

Optionally, other non-aqueous components can be present in the treating composition such as additional film formers, processing aids, and anti-static agents. Also, preferably there are present pH modifiers for the organo functional silane coupling agent and the condensation product of the polyamide when it is present. This pH modifier is preferably acetic acid used in customary amounts for the silane for hydrolysis and for the condensation product. Also with the presence of starch there may be present a fungicide or biocide that is well known to those skilled in the art in the customary amounts.

The treating composition has an amount of water to produce a proper viscosity and solids level for application to the surface of the glass-type substrates. Preferably, the amounts of the solids present in the treating composition for application to substrates like glass fibers as a size should not exceed that amount which will cause the viscosity of the treating composition to be greater than about 100 centipoise at 20° C. Viscosities of greater than 100 centipoise at this temperature make it difficult to apply the treating composition to glass fibers during their formation without breaking the fibers. For this application it is most preferred that the viscosity of the treating composition be between about 1 and 20 centipoise at 20° C. for best results. For other types of surfaces or substrates, the solids content can be that which is suitable to the particular form and shape of the substrate which has its surface treated with the treating composition. The sum of the amounts of any of the non-aqueous components on the basis of the total non-aqueous components equals around 100 percent, and the sum of all of the components including water on a total weight percent basis also equals 100 percent.

Generally, the preparation of the treating composition can occur by the simultaneous or sequential addition of the components to form the treating composition. One suitable sequence of addition is where the composition is prepared by adding the desired quantities of the components in the following sequence. Warm water at a temperature of around 110 to 120° F. (43° C. to 49° C.), preferably deionized, is added to a premix slurry tank and agitated and starch=is added with continuous agitation until the starch is dispersed. The starch is cooked in a standard jet cooker at a temperature preferably around 250° F. to 260° F. (121° C. to 127° C.) at the standard rate and preferably a rate of around two gallons/minute (7.57 L/minute). The cooked starch is conveyed to the main mix tank. The acetic acid is added to cold, around 60 to around 80° F. (16° C. to 27° C.), water in a premix tank and the condensation product of the polyamine and fatty acids, if used, is added to this mix with agitation until dissolved afterwhich the mix is added to the main mix tank. Hot water at a temperature of around 120 to 140° F. (48° to 60° C.) is added to a separate premix tank and the polymeric material like poly(vinylpyrrolidone) is added with agitation until dissolved and clear and transferred to the main mix tank. To a separate premix tank, cold water is added along with a small amount of acetic acid for hydrolyzation of the silane. The organo functional silane is added at a moderate rate and agitated until dissolved and this mixture is transferred to the main mix tank. In a separate mix tank, hot water is added along with the addition of the cationic lubricant and this mixture is agitated until the cationic lubricant is dissolved and the mixture is added to the main mix tank. With the use of an additional cationic lubricant, hot water is added to a premix tank and the additional cationic lubricant is added and agitated until dispersed and then added to the soluble portion of the composition. The adhesion promoter, when used, is added to a premix tank preferably along with or before or after the addition of the emulsifier and hot water and the emulsification is conducted with an Eppenbach mixer with the slow addition of hot water to invert the emulsion. Upon inversion, water is added with continued mixing to dilute the emulsion to around 10 percent.

The pH is adjusted to greater than around 6 with around 10 percent sodium hydroxide or any other material to adjust the pH. Warm water is added to dilute the wax emulsion in a premix tank and the mix is added preferably slowly to the main tank with agitation for around 10 minutes. The composition is preferably used at around a hot temperature.

The aqueous treating composition is applied to glass-type surfaces by any method known to those skilled in the art. The glass-type surfaces can be glass on a glass substrate of any form or shape including and preferably as glass fibers. Additionally, other surfaces made of silica oxide, metal oxide or mixtures thereof like those found in glass can be treated with the composition. The surface of the substrate can have the same material as the substrate or can be a glass-type coating on a substrate of a different material. The substrate can have any shape from fibrous to particles to sheets. Preferably, the surface is that of the substrate of glass fibers that preferably are treated with the treating composition during their formation by any method known to those skilled in the art. The application of the composition, which in this case is a size or binder, to the fiber results in strands of fibers that can have about 0.5 to about 3 weight percent of the size, preferably around 0.8 to around 1.5 weight percent on a loss on ignition (LOI) basis. This range is based on the size having a preferred amount of solids in the range of around 4 to around 6 weight percent. The LOI test is a well-known technique for determining the amount of size on glass fibers.

The filament or fiber diameters generally range from around less than 3 to around 30 microns such as beta fibers to fibers with larger diameters that can still allow for processing like twisting, roving or chopping of bundles of fibers. The glass fibers themselves can be formed by any method known to those skilled in the art by direct or indirect melt processes and forming the fibers through orifices in a bushing. Preferably, water sprays and conditioned air are used to cool the fibers, and the fibers are treated thereafter with the aqueous size preferably, shortly after their attenuation from the bushing and their cooling. The fibers are drawn from the bushing by a winder, and after the size is applied, the fibers can be gathered into one or more strands and wound into an annular package on the winder. Preferably, the strands have the construction of G-150 strands, although the strands can have any construction known to those skilled in the art and especially for screen yarn applications.

The glass fiber strands with size in the multilayered packages are dried to reduce the moisture content of the package to generally in the range of about 1 to 15 weight percent of the package. Accomplishing the moisture reduction usually involves drying the packages in an oven at conventional temperatures and times or by air drying for conventional time periods. Another approach to drying involves placing the paper tube with the strand deposited thereon in a humidity and temperature-controlled environment and conditioning them for 8 hours. The drying of the treated surface to less than one weight percent moisture is appropriate when the strands of sized glass fibers are processed into twisted strands or yarn. For this processing the strands are preferably air dried for around 12 to around 48 hours. Additionally the sized glass fibers can be used as wet or dry chopped glass fiber strands to reinforce the polymers. Preferably the strand are twisted and wound onto bobbins.

The twistable strand of glass fibers with binder of the present invention can be twisted by any glass fiber twisting techniques known to those skilled in the art. For instance, any twist frames for twisting glass fibers that are known to those skilled in the art are useful in twisting the glass fibers of the present invention. For example, twisting can be conducted as described in the book entitled "The Manufacturing Technology of Continuous Glass Fibers" by K. L. Lowenstein, Elsevier Publishing Company, New York, 1973, and the second edition 198. Generally, the level of twist can be in the range of around 0.5 to around 3 turns/inch, but preferably is around 1.3 in the Z direction. Twisting places a demand on the twistable strand in that the strand must be flexible enough to undergo the rigors of twisting and allow for the individual filaments being free to move in the bundle or strand. The twisted strand or yarn present on the bobbin is useful in producing woven and non-woven fabrics, knitted and/or braided products and reinforcement for various polymeric products. Woven fabric can be produced with any conventional shuttle loom, air jet loom, rapier loom, or shuttleless weaving machine known to those skilled in the art.

The treated substrates like the sized glass fiber strands are useful in myriad forms in various ways with polymers like the vinyl addition polymers of poly(vinylchloride) and plasticized polyvinyl chloride as in plastisol formulations. For instance, the strands of glass fibers can be formed into woven or nonwoven mats for impregnation and/or encapsulation or coating by the poly(vinylchloride) or plasticized poly(vinylchloride) such as plastisols and organosols. Woven and nonwoven mat formation can be accomplished by any method known to those skilled in the art. Traditionally, the woven mats or cloth are produced from the twisted glass fiber strands. The use of the term "plastisol" is with its standard definition that a dispersion of a resin in a plasticizer. For example, a vinyl plastisol is a uniform dispersion of a vinyl resin in an appropriate plasticizer. When such a mixture is heated for vinyl resins to a temperature above 300° F. (149° C.), the vinyl resin dissolves in the plasticizer resulting solution. This solidified plastisol is a tough plastic material as opposed sometimes to its original resin which lacks these properties.

The impregnation, encapsulation, reinforcement and coating operations can be conducted by any method known to those skilled in the art with polymeric formulation like vinyl addition polymers and copolymers such as polyvinylchloride plastisols known to those skilled in the art. For example, a nonwoven chopped or continuous strand glass fiber mat can be impregnated, encapsulated, or coated with a plastisol formulation having the polyvinylchloride homopolymer in 100 parts by weight, a plasticizer in 50 parts by weight, a stabilizer in 7.5 parts by weight, a diluent in 2 parts by weight, and polyethyleneglycol 300 in 3 parts by weight along with a titanium dioxide pigment in an amount of 2.5 parts by weight per 100 parts of resin. This heat-curable liquid PVC plastisol or organosol can be others like those described in U.S. Pat. Nos. 3,458,337 and 3,293,094.

With many various conventional PVC plastisols and organosol formulations useful with the treated surface of the present invention, the selection of any particular plastisol or organosol formulation depends on such factors as the nature of the substrate, the particle size of the poly(vinylchloride) or polymer resin, the viscosity and degree of solvation of the plastisol with the most important factor being the nature of the substrate. The desired viscosity of the liquid poly(vinylchloride) resin (plastisol or organosol) depends somewhat upon the particular application. If the liquid poly(vinyichloride) resin is applied to just one surface of the substrate with subsequent pressure being applied to force the resin through the substrate, such as a mat, the resin can generally be of somewhat higher viscosity. Lower viscosities are used when the plastisol is applied to woven or nonwoven mat or cloth with a coater. Generally, the viscosities of the liquid poly- (vinylchloride) for application to glass fiber mats and fabrics range between about 500 to about 10,000 centipoise at coating temperatures as measured by a Brookfield RVF viscometer with a No. 3 spindle at 20 RPM. The dispersion or suspension of poly(vinylchloride) liquid resins can have the conventional particle sizes and intrinsic viscosities. For dispersion resins, the particle sizes can be around 0.5 to about 5 microns with intrinsic viscosities that are higher than those of suspension resins. The particle size for suspension resins can range from about 5 to about 50 microns. After the polymer such as the poly(vinylchloride) plastisol or organosol is combined with the substrate, such as a woven cloth or mesh of glass fiber strands, or mat by any suitable means such as knife coating, roll coating or dip saturation, the PVC is usually gelled. This can be performed by contacting the substrate with the polymer by one or more heated rolls. Depending upon the nature of the substrate after gelling of the resin, the material may be passed through compression rollers.

Compared with commercially available sized glass fiber strands for use with polymeric plastisol formulations like that produced in accordance with the teachings of U.S. Pat. No. 4,221,602, the sized glass fiber strands having the construction of G150 produced with the sizings of Table 1 in accordance with the description for producing sized glass fiber strands gave improved adhesion to the matrix polymer like poly(vinylalcohol) and improved processibility over the commercially available material.

For a more complete understanding of the invention, reference is made to the following nonlimiting examples which illustrate the treating compositions for the treated surfaces like fibers for strands for the polymeric reinforcement or substrate.

type of silane used which was either the A-174, gamma-methacryloxypropyltrimethoxysilane or the A-187 the gamma-glycidoxypropyltrimethoxysilane both of which are available from Union Carbide Chemicals and Elastics Corporation. The superscript "3" refers to the presence of an emulsifier for the PX-336 promoter. The Tween 81 emulsifier was present in formulations 5, 12 and 13 along with the PX-336 in an amount of 10 weight percent of the PX-336.

The formulation of Example 1 was used to make several samples of G-150 strands of glass fibers in accordance with the method described herein. These several samples were tested in microwarping and plastisol coating experiments and the results are presented in Table 2. The experiments were conducted in essentially the same manner for the various samples except for the differences noted in Table 2 where the plastisol coating, which was a standard coating formulation, was applied in a similar manner for all of the samples. The broken filament detector of U.S. Pat. No. 4,610,707 was used to compare a sample of G-150 prepared wish the formulation of example 5 of table 1 versus that of a G-150 twisted strand product prepared in accordance with U.S. Pat. No. 221,602. As the results of Table 2 show the chemically treated glass fiber strands of the present invention gave improved processability.

TABLE 2

| Sample No./<br>Yarn Property | I. Microwrapping and Physicals | | | | | |
|---|---|---|---|---|---|---|
| | 1A | 1B | 1C | 1D | 5 | '602 Patent |
| LOI, % | 0.96 | 0.68 | 0.76 | 0.76 | — | — |
| Twist Level, TPI Z | 1.29 | 1.33 | 0.97 | 0.96 | — | — |

TABLE 1

Weight Percent Solids of Aqueous Chemical Size

| Components: | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Starch | | | | | | | | | | | | | |
| Amaizo 213 | 17 | — | — | 17 | — | — | 33 | 33 | 0 | 33 | 33 | 35.8 | — |
| Kollotex | — | 17 | — | — | — | — | — | — | 0 | — | — | — | 36.2 |
| Water Dispersible Starch (National R6990) | — | — | 17 | — | 17 | 17 | — | — | 33 | — | — | — | — |
| Wax (ML-296) | 50 | 50 | 50 | 50 | 50 | 50 | 34 | 34 | 34 | 34 | 34 | 35.8 | 36.2 |
| Cationic Lubricant | | | | | | | | | | | | | |
| Emery 6717 | 15 | 15 | 7.5 | 7.5 | 11.5 | 15 | 15 | 15 | 7.5 | 15 | 15 | 3.6 | 8.3 |
| Cation-X | — | — | 7.5 | 7.5 | — | — | — | — | 7.5 | — | — | — | — |
| Fatty Acid Polyamine Condensation Product[1] | 8.6 | 8.6 | 8.6 | 8.6 | 8.6 | 8.6 | 8.6 | 8.6 | 8.6 | 8.6 | 8.6 | — | — |
| Poly(vinylpyrrolidone) | 7 | 7 | 7 | 7 | 7 | 7 | 0 | 7 | 7 | 7 | — | 7.6 | 7.5 |
| Poly(oxyalkylene)polyol (Pluracol V-10) | — | — | — | — | — | — | 7 | — | — | — | 7 | — | — |
| Organo Functional Silane[2] (A-174/A-187) | 2.4 | 2.4 | 2.4 | 2.4 | 2.4 | 2.4 | 2.4 | 2.4 | 2.4 | 2.4 | 2.4 | 2.9 (187) | 2.7 (187) |
| Adhesion Promoter(PX-336)[3] | — | — | — | — | 3.8 | — | — | — | — | — | — | 14.3 | 9.1 |
| Treated Strand Performance | Best | | Good | | Best | | | | | Good | | | |

In Table 1 superscript "1" refers to the condensation product having an amount of acetic acid added to adjust the pH and this amount was 60 grams in the above formulations. The superscript "2" refers to a pH modifier that was added to the silane coupling agent that again was acetic acid although any other pH modifier could be used as in the case of the condensation product. The amount added was 40 grams for the above formulations. Also this superscript refers to the TABLE 2-continued

| Average Broken Filaments | 0.1 | 0.07 | 0.02 | 0.02 | — | — |
|---|---|---|---|---|---|---|
| No. of Sloughs per 10 Bobbins | 0 | 0 | 0 | 0 | — | — |
| Major Defects/Mey | 0.7 | 0.7 | 0 | 0 | — | — |
| Tensile Strength, Lbs. | 4.9 | 4.2 | 4.5 | 4.7 | — | — |

TABLE 2-continued

| Broken Filaments per 1000 Yards | — | — | — | — | 1.6 | 6.65 |

| II. Plastisol Coating | | |
|---|---|---|
| Sample No./ Coating Property | 1E | 1F |
| No. of Broken Filaments, 2 Hours | 0.4 | 0.4 |
| No. of Broken Filaments, 4 Hours | 0.5 | 0.5 |
| No. of Broken Filaments, Inner | 0.9 | 1.5 |
| No. of Die Breaks | 0 | 0 |
| Creel Broken Filaments | Light | Light |
| Die Broken Filaments | Light | Light |
| Total Quality Points | 95.0 | 94 |
| Bobbin Hardness | 62 | 64 |
| Twist Level/%, LOI | 1.3 TPI/0.96 | 0.97 TPI/0.76 |

I claim:

1. Glass fibers having applied thereto the dried residue of an aqueous coating composition that is compatible with poly(vinyl chloride), wherein the coating composition comprises:

(a) at least one starch;

(b) at least 47 weight percent of the chemical treatment composition on a non-aqueous basis of at least one wax;

(c) about 3 to about 20 weight percent of the chemical treatment composition on a non-aqueous basis of a cationic lubricant;

(d) about 3 to about 20 weight percent of the chemical treatment composition on a non-aqueous basis of at least one organofunctional silane coupling agent;

(e) up to about 20 weight percent of the chemical treatment composition on a non-aqueous basis of a polymer adhesion promoter selected from the group consisting of an ester and an anhydride of a carboxylic acid:

(f) at least one material selected from the group consisting of:
      (1) about 1 to about 15 weight percent of the chemical treatment composition on a non-aqueous basis of a polymeric film forming material other than starch, wherein the amount of the polymeric film forming material is less than the amount of the wax; and
      (2) about 1 to about 20 weight percent of the chemical treatment composition on a non-aqueous basis of a condensation product of a polyamine and a fatty acid; and (g) a carrier for application of the chemical treatment composition to the glass fibers, wherein the chemical treatment composition is essentially free of mono-, di- and triglycerides.

2. A glass fiber according to claim 1, wherein the starch is selected from the group consisting of: (1) a mixture of modified potato and crosslinked corn starches both with a low amylose content, and (2) a low amylose starch that is water soluble after cooking.

3. A glass fiber according to claim 1, wherein the polymeric film forming material is selected from the group consisting of: polyvinylpyrrolidone, polyoxyalkylene polyols, poly(alkylene) polyols and mixtures thereof.

4. A glass fiber according to claims 1, wherein the wax is selected from the group consisting of: (1) a microcrystalline wax, (2) an oxidized derivative of the microcrystalline wax where the wax is selected from the group consisting of nonionic and anionic waxes, the wax being essentially free of cationic waxes, and (3) mixtures of these microcrystalline waxes with other hydrocarbon waxes, wherein the ratio in weight percent of microcrystalline wax to other hydrocarbon waxes is 1:99 to 99:1.

5. A glass fiber according to claim 1, wherein the at least one condensation product of a polyamine with a fatty acid has the formula:

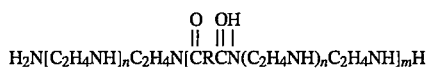

wherein: R is an aliphatic radical having from 14 to 34 carbon atoms; n is an integer ranging from 0 to 3; and m ranges from 1 to 15.

6. A glass fiber according to claim 1, wherein the adhesion promoter is selected from the group consisting of: di-2-ethylhexylphthalate, dioctylphthalate, diisooctylphthalate, diisodecylphthalate, 1,2,4-benzene tricarboxylic acid esters with aliphatic alcohols having 6 to 10 carbon atoms, mixed normal alkyl trimellitates, and mixtures thereof.

7. A glass fiber according to claim 1, wherein the adhesion promoter has a boiling point above about 225° C. (437° F.) at a pressure of 10 millimeters of mercury (mm Hg).

8. A glass fiber according to claim 1, further comprising at least one emulsifier for the adhesion promoter, wherein the emulsifier is present in an amount up to about 20 percent of the amount of the adhesion promoter, the emulsifier being selected from the group consisting of: polyoxyethylene (4) sorbitan monolaurate and polyoxyethylene (5) sorbitan monolaurate.

9. A vinyl addition polymer-compatible chemically treated glass substrate, wherein the chemical treatment composition applied to the glass substrate comprises:

(a) at least one starch;

(b) at least 47 weight percent of the chemical treatment composition on a non-aqueous basis of at least one wax;

(c) about 3 to about 20 weight percent of the chemical treatment composition on a non-aqueous basis of a cationic lubricant;

(d) about 3 to about 20 weight percent of the chemical treatment composition on a non-aqueous basis of at least one organofunctional silane coupling agent;

(e) up to about 20 weight percent of the chemical treatment composition on a non-aqueous basis of a polymer adhesion promoter selected from the group consisting of an ester and an anhydride of a carboxylic acid;

(f) at least one material selected from the group consisting of:
      (1) about 1 to about 15 weight percent of the chemical treatment composition on a non-aqueous basis of a polymeric film forming material other than starch, wherein the amount of the polymeric film forming material is less than the amount of the wax; and
      (2) about 1 to about 20 weight percent of the chemical treatment composition on a non-aqueous basis of a condensation product of a polyamine and a fatty acid; and (g) a carrier for application of the chemical treatment composition to the glass substrate, wherein the chemical treatment composition is essentially free of mono-, di- and triglycerides.

10. A vinyl addition polymer-compatible substrate according to claim 9, that are sized glass fiber strands.

11. A vinyl addition polymer-compatible substrate according to claim 9, wherein the starch is selected from the group consisting of: (1) a mixture of modified potato and crosslinked corn starches both with a low amylose content, and (2) a low amylose starch that is water soluble after cooking.

12. A vinyl addition polymer-compatible substrate according to claim 9, wherein the polymeric film forming material is selected from the group consisting of: polyvinylpyrrolidone, polyoxyalkylene polyols, poly(alkylene) polyols and mixtures thereof.

13. A vinyl addition polymer-compatible substrate according to claim 9, wherein the wax is selected from the group consisting of: (1) a microcrystalline wax, (2) an oxidized derivative of the microcrystalline wax where the wax is selected from the group consisting of nonionic and anionic waxes, the wax being essentially free of cationic waxes, and (3) mixtures of these microcrystalline waxes with other hydrocarbon waxes, wherein the ratio in weight percent of microcrystalline wax to other hydrocarbon waxes is 1:99 to 99:1.

14. A vinyl addition polymer-compatible substrate according to claim 9, wherein the wax is at least about 50 weight percent of the chemical treatment composition on a non-aqueous basis.

15. A vinyl addition polymer-compatible substrate according to claim 9, wherein the cationic lubricant is selected from the group consisting of partially amidated polyalkylene polyamines, alkyl imidazoline derivatives and mixtures thereof.

16. A vinyl addition polymer-compatible substrate according to claim 9, wherein the at least one condensation product of a polyamine with a fatty acid has the formula:

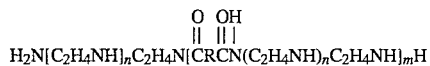

wherein: R is an aliphatic radical having from 14 to 34 carbon atoms; n is an integer ranging from 0 to 3; and m ranges from 1 to 15.

17. A vinyl addition polymer-compatible substrate according to claim 9, wherein the adhesion promoter is selected from the group consisting of di-2-ethylhexylphthalate, dioctylphthalate, diisooctylphthalate, diisodecylphthalate, 1,2,4-benzene tricarboxylic acid esters with aliphatic alcohols having 6 to 10 carbon atoms, mixed normal alkyl trimellitates, and mixtures thereof.

18. A vinyl addition polymer-compatible substrate according to claim 9, wherein the adhesion promoter has a boiling point above about 225° C. (437° F.) at a pressure of 10 millimeters of mercury (mm Hg).

19. A vinyl addition polymer-compatible substrate according to claim 9, which further comprises at least one emulsifier for the adhesion promoter.

20. A vinyl addition polymer-compatible substrate according to claim 19, wherein the emulsifier is present in an amount up to about 20 percent of the amount of the adhesion promoter, the emulsifier being selected from the group consisting of: polyoxyethylene (4) sorbitan monolaurate and polyoxyethylene (5) sorbitan monolaurate.

* * * * *

UNITED STATES PATENT AND TRADEMARK OFFICE
CERTIFICATE OF CORRECTION

PATENT NO. : 5,466,528
DATED : November 14, 1995
INVENTOR(S) : Mikhail M. Girgis It is certified that error appears in the above-indentified patent and that said Letters Patent is hereby corrected as shown below:

Claim 1, column 11, line 40, delete ":" after the word acid and insert --;--.

Claim 4, column 11, line 65, delete the word "claims" and insert --claim--.

Signed and Sealed this

Twentieth Day of August, 1996

*Attest:*

BRUCE LEHMAN

*Attesting Officer*  Commissioner of Patents and Trademarks